UNITED STATES PATENT OFFICE.

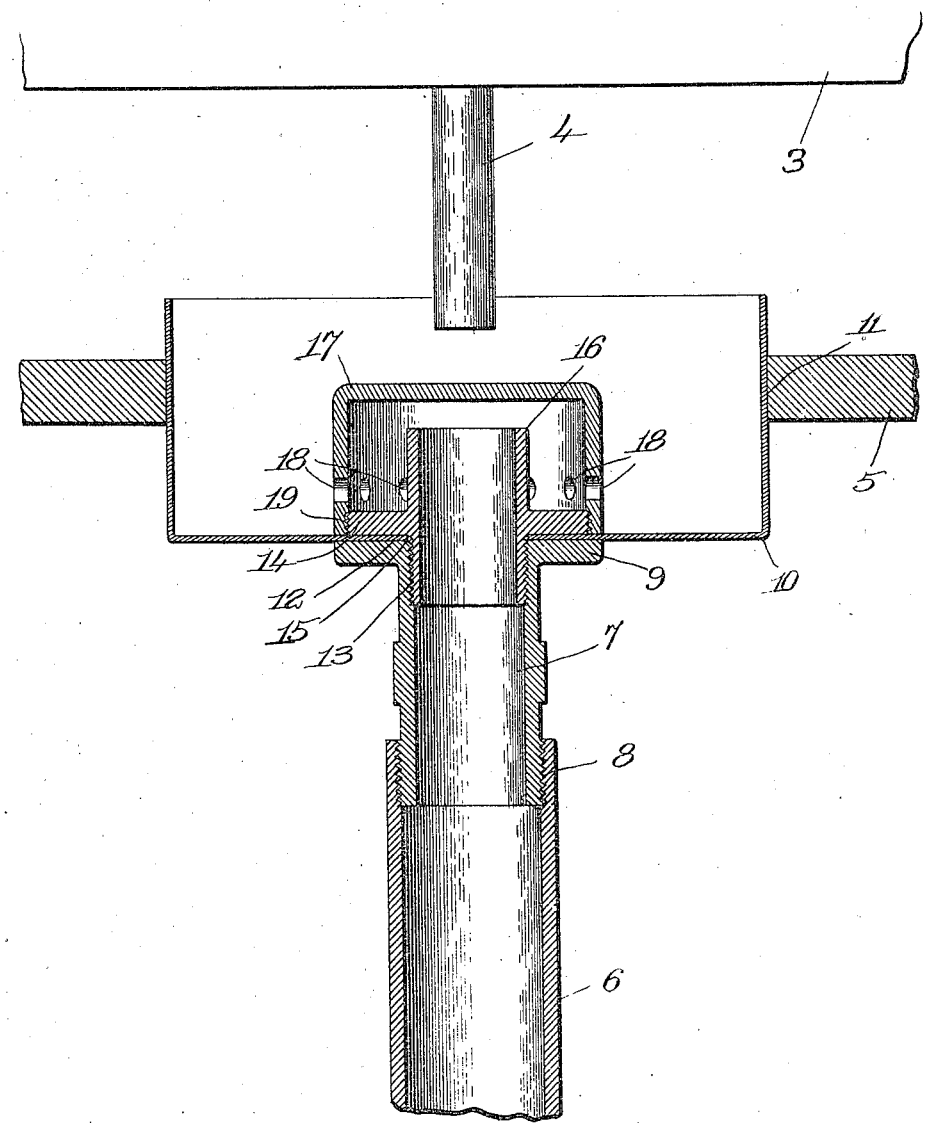
J. PODOLSKY.
TRAP FOR REFRIGERATORS.
APPLICATION FILED OCT. 5, 1911.
1,034,505.
Patented Aug. 6, 1912.

JACOB PODOLSKY, OF BOSTON, MASSACHUSETTS.

TRAP FOR REFRIGERATORS.

1,034,505.

Specification of Letters Patent.

Patented Aug. 6, 1912.

Application filed October 5, 1911. Serial No. 652,935.

*To all whom it may concern:*

Be it known that I, JACOB PODOLSKY, a citizen of the United States, residing at Boston, county of Suffolk, and State of Massachusetts, have invented an Improvement in Traps for Refrigerators, of which the following description, in connection with the accompanying drawing, is a specification, like characters on the drawing representing like parts.

This invention relates to traps and particularly to traps that are adapted to be used with refrigerators, ice chests, etc.

The object of the invention is to provide a simple and inexpensive trap for this purpose which is sustained entirely by the waste pipe instead of by the floor and which can be readily put in place after the floor is laid, and which has such a construction that the cap can be readily removed for cleaning the trap without disturbing any of the other operative parts.

Further objects of the invention are to improve generally traps of this nature, all as will be more fully hereinafter described and then pointed out in the appended claims.

In the drawings I have shown in vertical section a trap embodying my invention.

3 designates the bottom of a refrigerator or ice chest and 4 a drip pipe extending therefrom through which the waste water is delivered.

5 is the floor of the building on which the ice chest is supported, and 6 is the waste pipe which is permanently placed in the house and which may lead to a sewer drain or any other locality. In a building or house it is customary to place the waste pipes, soil pipes, etc., in the walls before the house is finished and after the house is finished to make the proper connections to them.

As stated above my improved trap is such that the trap connections to the waste pipe 6 can be readily made after the floor is laid.

My improved trap comprises a pan-supporting member 7 in the form of a short piece of pipe which has screw-threaded connection with the waste pipe 6, as shown at 8, and which is provided at its upper end with a flange 9 forming a rest or support for the pan 10. The pan 10 may be cast iron or may be made of sheet metal as desired and may have any suitable shape. This pan is designed to set into an opening 11 formed in the floor 5 and the top of the pan will preferably project slightly above the floor, as shown in the drawings. The pan rests on the flange 9 and is clamped in position thereon by means of a clamping member 12. This clamping member 12 is tubular and is provided with a nipple 13 which screws into the pan-supporting member 7 and is also provided with a clamping flange 14 which clamps the bottom of the pan against the flange 9. The pan is provided with an opening 15 in its bottom through which the nipple 13 extends, and by the construction shown a sufficiently tight joint can be made to prevent any leakage of water through the opening 15 in the pan. This clamping member is also provided with the portion 16 which extends above the flange 14 and over which the water from the pan flows in passing to the waste pipe.

The seal for the trap is formed by a cap 17 which incloses the portion 16 of the clamping member and which is provided with apertures 18 in its side walls. This cap is held in position by screw-threading it to the flange 14, as shown at 19, said flange being exteriorly screw-threaded for this purpose.

In installing the trap the drain pipe 6 is built into the house as usual and the members 7 and 12 may be left in position. After the floor has been laid a hole is cut therein at the proper point and of the proper size to receive the pan 11, and the clamping member 12 is removed and the pan is then set onto the flange 9 and clamped in place by the clamping member 12. The cap 17 may then be applied and the trap is ready for use.

To clean the trap involves merely the removal of the cap 17 and this can be readily accomplished without the aid of tools or special appliances.

My improved trap is sustained entirely by the drain pipe and projects very little, if at all, above the floor line 5.

While I have illustrated one embodiment of my invention I do not wish to be limited to the constructional features shown.

Having fully described my invention, what I claim as new and desire to secure by Letters Patent is:—

1. In a trap for refrigerators, the combination with a waste pipe, of a pipe section connected thereto and having a flange at its upper end and being interiorly screw-threaded at said end, a pan resting on said flange and having an aperture registering with the pipe section, a clamping member having a nipple extending through the hole in the pan and screwed into the upper end of the pipe section, said clamping member having a flange to overlie the bottom of the pan and clamp the latter against the flange of the pipe section, said clamping member being removable from the pipe section without removing the latter from the waste pipe and having a portion 16 extending above the flange, and an apertured cap covering said portion 16 and removably secured to the flange of the clamping member.

2. In a trap for refrigerators, the combination with a tubular pan-supporting member having a flange, of a pan supported on said flange and having an aperture registering with the opening of said member, a clamping member having a nipple extending through the hole in the pan and screwed into the supporting member and having a flange to overlie the bottom of the pan and clamp the latter against said member, said clamping member having a portion 16 extending above the flange, and a cap screwed to the flange of the clamping member and provided with apertures.

In testimony whereof, I have signed my name to this specification, in the presence of two subscribing witnesses.

JACOB PODOLSKY.

Witnesses:
 Louis C. Smith,
 Thomas J. Drummond.